Aug. 21, 1951     C. McFAULL     2,565,252

POWER ACTUATED SHEARING TREE AND BRUSH CUTTER

Filed Nov. 23, 1945     2 Sheets-Sheet 1

C. McFaull
INVENTOR.

BY *[signature]*
ATTORNEYS.

Aug. 21, 1951      C. McFAULL      2,565,252
POWER ACTUATED SHEARING TREE AND BRUSH CUTTER
Filed Nov. 23, 1945      2 Sheets-Sheet 2
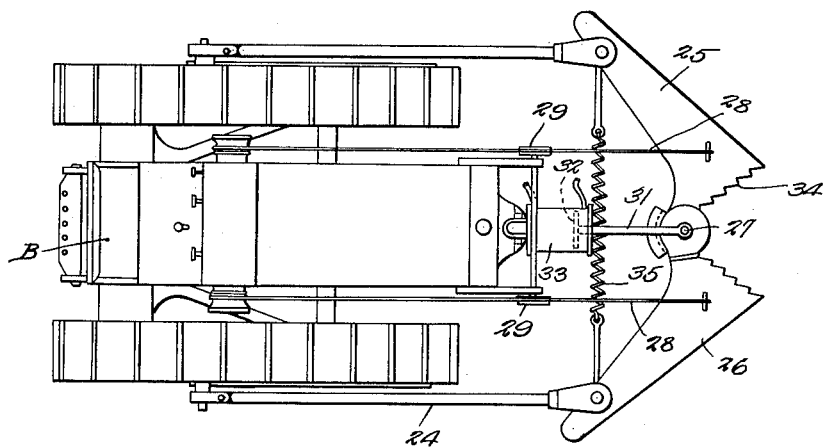
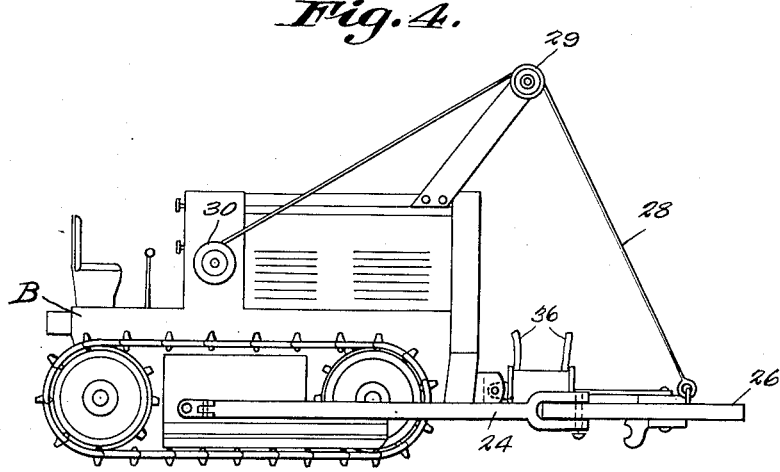
C. McFaull
INVENTOR.
BY
ATTORNEYS.

Patented Aug. 21, 1951

2,565,252

UNITED STATES PATENT OFFICE 2,565,252

POWER ACTUATED SHEARING TREE AND BRUSH CUTTER

Clarence McFaull, Georgetown, Tex.

Application November 23, 1945, Serial No. 630,236

4 Claims. (Cl. 144—34)

1

This invention relates to an attachment for use primarily on tractors and other vehicles whereby, through the use of fluid operated shears, it becomes possible to station the supported structure at any desired point and thereafter operate the shears to cut through trees and brush in the path thereof, to trim trees, etc.

It is another object of the invention to provide an attachment of this character the cutting elements of which can be easily adjusted to any desired distance above the ground.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings, the preferred forms of the invention have been shown.

In said drawings,

Figure 3 is a plan view showing a modified structure.

Figure 4 is a side elevation thereof.

Figure 1:
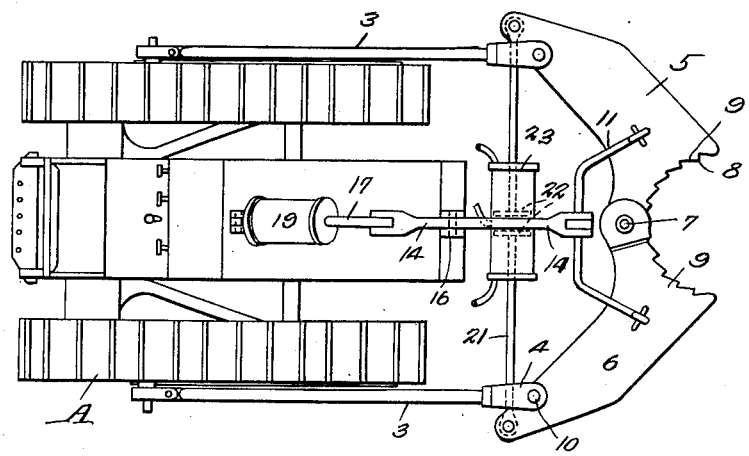
Figure 1 is a top plan view of a tractor equipped with the present improvements.

Referring to the figures by characters of reference, A designates a vehicle which, in the present instance, is in the form of a tractor.

It is to be understood that other vehicles could be used in connection with the present invention.

Connecting blocks 1 are pivotally joined to the sides of the structure, preferably adjacent to the rear end thereof, as shown at 2, these blocks being adapted to swing upwardly and downwardly relative to the vehicle. To each of the blocks is pivotally connected a side beam 3 mounted to swing laterally relative to its block 1 and, in the structure illustrated in Figures 1 and 2, these beams extend beyond the forward end of the vehicle where they are forked, as at 4.

The cutting elements per se have been indicated at 5 and 6 and are pivotally connected at their inner sides as shown at 7. Cutting edges 8 are provided at the pivoted ends of the cutting elements and these cutting edges can diverge forwardly along curved lines so that normally they define a recess or space sufficiently large to readily receive the material to be cut. If desired, these cutting edges can be formed of series of cutting teeth 9 the points of which are at the forward ends thereof as shown in Figure 1.

2

Figure 2:
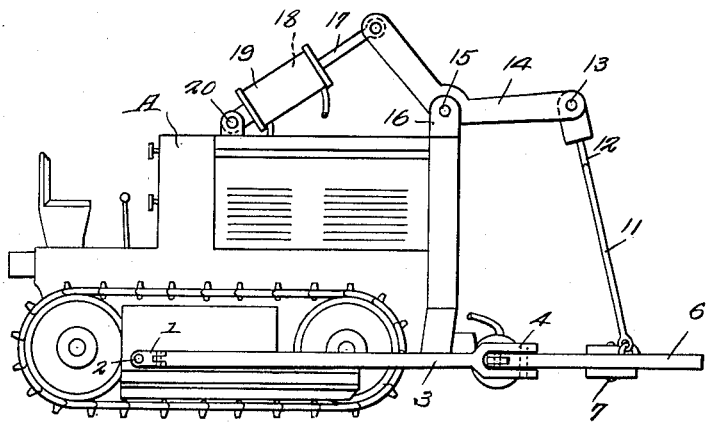
Figure 2 is a side elevation thereof.

The outer end portions of the cutting elements 5 and 6 are pivotally mounted at 10 within the respective forks 4 and, as shown particularly in Figure 1, a yoke 11 is pivotally connected to and extends upwardly from the cutting elements 5 and 6 at points adjacent to the cutting edges 9. This yoke has a shank 12 extending upwardly from the center thereof and pivotally connected at 13 to the forward end of a lever 14 which is fulcrumed between its ends, at 15 in the upper portion of a standard 16 mounted on the forward portion of the vehicle. The opposite end of lever 14 is pivotally connected to the piston rod 17 of a fluid operated piston 18 mounted for movement within a cylinder 19 which is fulcrumed at 20 on the top portion of the vehicle A.

The two cutting elements 5 and 6 extend laterally and rearwardly past the pivotal connection 10 and are joined, at their rear ends, to rods 21 extending in opposite directions from pistons 22 located in a cylinder 23 located back of the pivotally connected ends of the cutting elements. It is to be understood that all of the pistons are adapted to be operated by fluid under pressure through the use of any suitable controls so that, at desired times, piston 18 can be actuated to swing the cutting elements 5 and 6 upwardly with the side beams 3 and, by actuating the pistons 22, the rear ends of the cutting elements 5 and 6 can be thrust laterally and forwardly.

In practice the vehicle is driven up to the brush or tree to be cut and the forward ends of the cutting elements are brought into engagement therewith so as to embrace the same. In doing this, the pivotally connected ends of the two cutting elements will be thrust backwardly until the opposed cutting edges are brought firmly against the tree or brush. Thereafter fluid under pressure is directed between the pistons 22 so that the rear ends of the cutting elements 5 and 6 will be thrust apart, causing the opposed cutting edges 8 to bite into and sever the material supported therebetween. By providing shearing teeth such as shown at 9, this cutting operation is materially expedited. By means of the piston 18 and the use of fluid under pressure directed thereagainst, the cutting elements can be raised or lowered until brought to a desired distance above the ground prior to completing the cutting operation.

In the structure illustrated in Figures 3 and 4, the mechanism has been simplified. In addition to utilizing the side beams 24 which correspond with and act like the beams 3, the cutting elements 25 and 26, which are pivotally connected at 27, are adjustably supported by cables 28 or other suitable flexible devices extending over guide pulleys 29 and back to winding drums 30 which can be operated by the motor on the vehicle B. Obviously, with this mechanism the cutting elements can readily be raised or lowered to a desired elevation.

The pivot 27, in this modified structure, is connected to the rod 31 of a piston 32 in a cylinder 33 so that, when power is applied to one side of the piston, pivot 27 will be pulled backwardly, thereby causing the cutting elements 25 to swing about their connections with the beams 24 and causing their cutting edges 34 to move toward each other. These cutting edges can be toothed, as shown, and the teeth can be arranged along diverging straight lines if desired.

For the purpose of holding the cutting elements normally spread apart at their toothed edges, a normally tensioned spring 35 can be interposed between and connected to the cutting elements at their points of connection with the side beams 24.

Obviously, by reason of the construction disclosed in Figures 3 and 4, this modification is especially suitable for cutting at levels below the vehicle as, for example, when it is desired to sever vegetation located below a water level. The adjusting or supporting cables 28 can be payed out until the cutting elements are brought to any desired position as will be apparent, and by utilizing hose of desired lengths leading to the cylinder 33, the cutting elements can be operated while well beneath the water level. These hose for directing fluid under pressure to the cylinder have been indicated in part at 36.

By the term "fluid operated" pistons is meant any power means adapted to be actuated by air or liquid under pressure. Obviously, the means employed for supplying this fluid under pressure can be of any standard type and no attempt has been made to describe or show the same in detail.

What is claimed is:

1. A tree and brush cutter comprising a motor vehicle, a push bar pivoted to each side of said motor vehicle for lateral swinging movement, a transverse horizontal shear blade pivoted at substantially its outer end to the forward end of each push bar in front of the vehicle, a common pivot connecting the inner ends of said shear blades, a power operated motor means mounted on said vehicle and operatively connected to both of said blades for pivoting the same with respect to each other for effecting cutting of the tree or brush, said push bars being pivoted to the vehicle for vertical swinging movement to permit vertical adjustment of said blades, and power operated means to vertically adjust said blades.

2. A tree and brush cutter comprising a motor vehicle, a push bar pivoted to each side of said motor vehicle for lateral swinging movement, a transverse horizontal shear blade pivoted at substantially its outer end to the forward end of each push bar in front of the vehicle, a common pivot connecting the inner ends of said shear blades, a power operated motor means mounted on said vehicle and operatively connected to both of said blades for pivoting the same with respect to each other for effecting cutting of the tree or brush, said push bars being pivoted to the vehicle for vertical swinging movement to permit vertical adjustment of said blades, and power operated means to vertically adjust said blades, said power operated motor means including a double acting reciprocating fluid pressure motor having a cylinder pivoted to the front of the vehicle for vertical swinging movement and a piston operable in said cylinder and provided with a rod pivoted to the pivot connecting said shear blades.

3. A tree and brush cutter comprising a motor vehicle, a push bar pivoted to each side of said motor vehicle for lateral swinging movement, a transverse horizontal shear blade pivoted at substantially its outer end to the forward end of each push bar in front of the vehicle, a common pivot connecting the inner ends of said shear blades, a power operated motor means mounted on said vehicle and operatively connected to both of said blades for pivoting the same with respect to each other for effecting cutting of the tree or brush, said push bars being pivoted to the vehicle for vertical swinging movement to permit vertical adjustment of said blades, and power operated means to vertically adjust said blades, said shear blades extending outwardly beyond the pivotal connections of the shear blades with the push bars, said power operated motor means including a double acting, reciprocating fluid pressure motor having a cylinder disposed transversely of the vehicle between the latter and the shear blades, and reciprocating pistons in said cylinder having piston rods pivoted to the outer ends of the respective shear blades.

4. A cutting attachment for a portable supporting structure including arms mounted for movement relative to the portable supporting structure, in vertical as well as horizontal directions, means for raising and lowering the arms, relatively movable cutting members pivotally secured to each other and operably supported by the arms for movement in horizontal directions, a cylinder operably interposed between the cutting members, fluid-actuated pistons slidable within the cylinder and operably connected to the cutting members and mutually operable relative thereto to impart equal force directly to each cutting member to thereby move them about their pivots to sever material located therebetween.

CLARENCE McFAULL.

REFERENCES CITED

The following references are of record in the file of this patent:

UNITED STATES PATENTS

| Number | Name | Date |
|---|---|---|
| 944,555 | Holden | Dec. 28, 1909 |
| 1,894,516 | Karstedt | Jan. 17, 1933 |
| 2,187,707 | Kane | Jan. 16, 1940 |
| 2,214,334 | Knight | Sept. 10, 1940 |
| 2,332,561 | Drott | Oct. 26, 1943 |
| 2,366,909 | Johnson | Jan. 9, 1945 |

FOREIGN PATENTS

| Number | Country | Date |
|---|---|---|
| 119,846 | Germany | May 18, 1901 |